Figure 5:
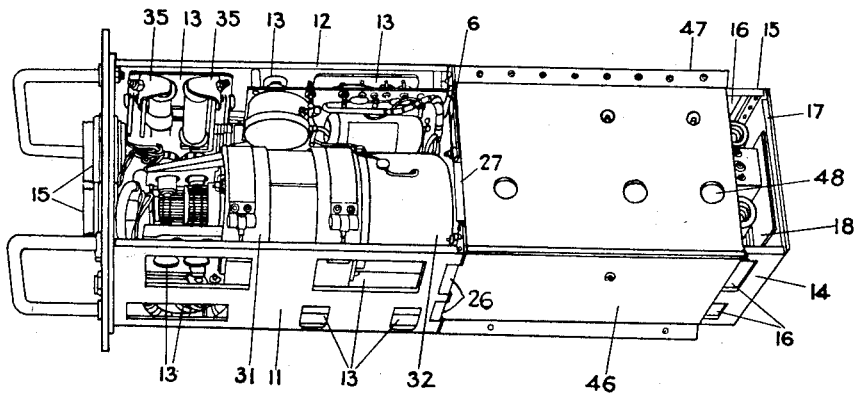

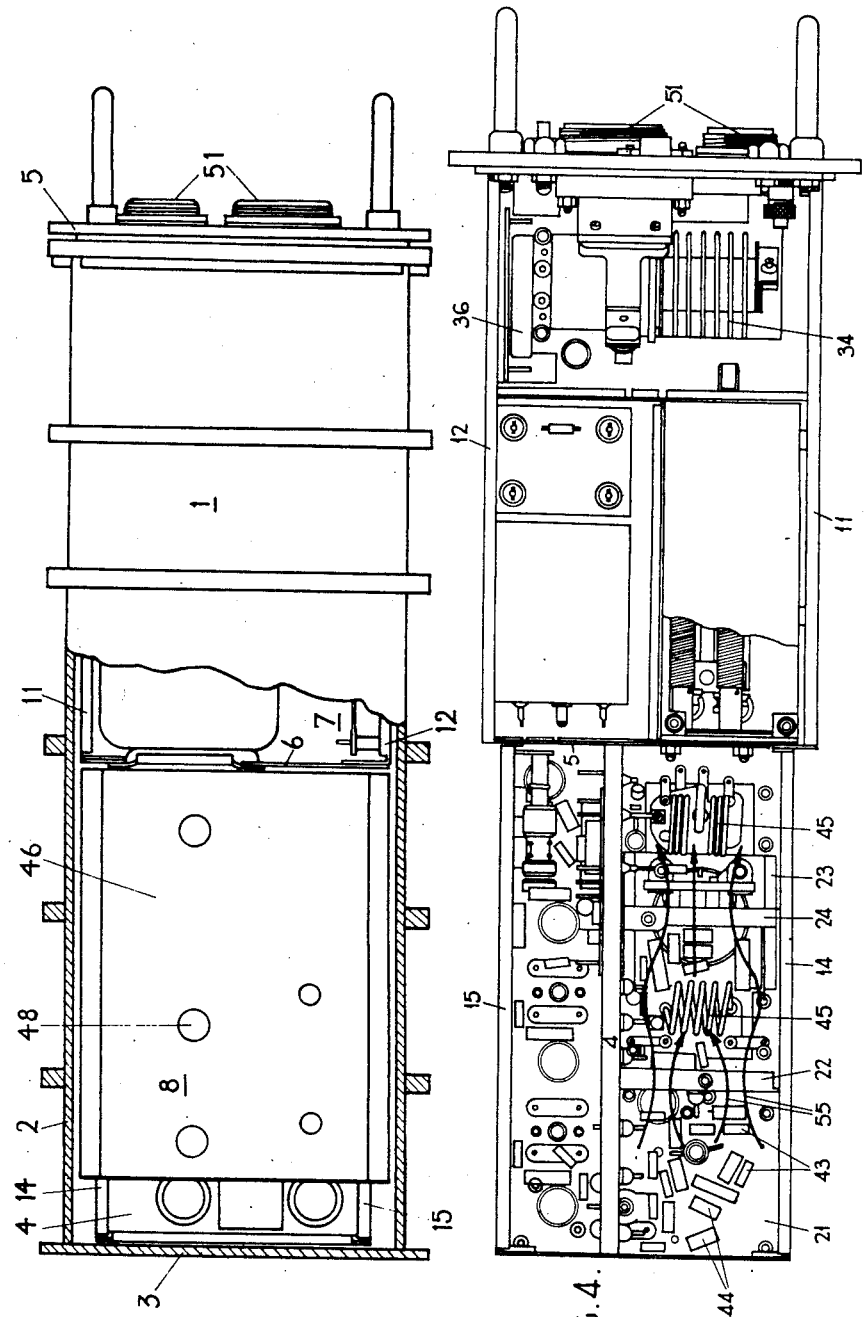

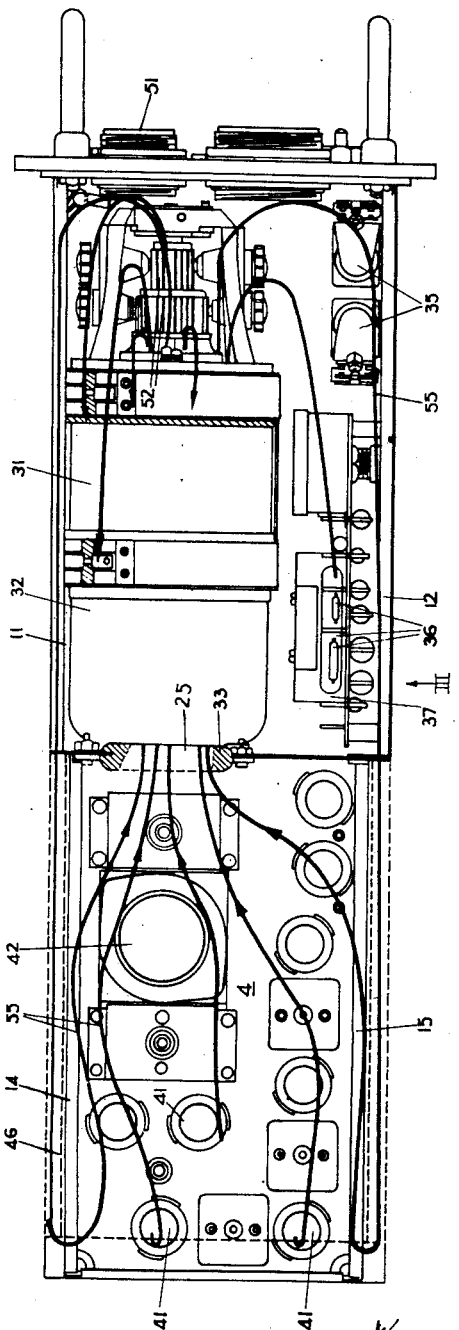

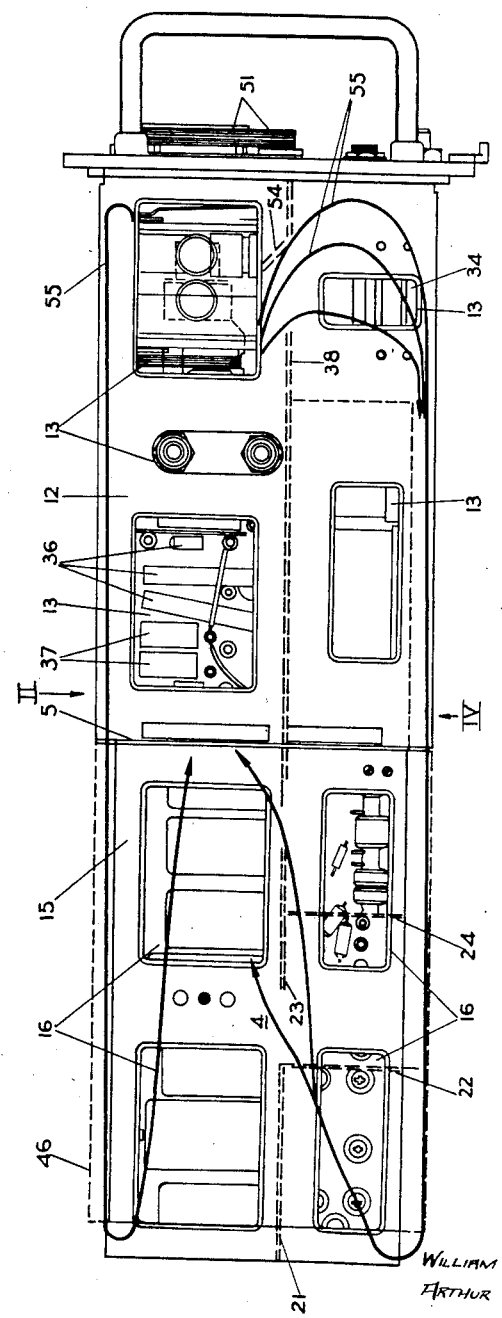

May 7, 1957 W. H. L. HEWITT ET AL 2,791,621
ELECTRICAL APPARATUS
Filed Jan. 17, 1952 4 Sheets-Sheet 4

INVENTORS
WILLIAM HENRY LEWIS HEWITT
ARTHUR IAN FORBES SIMPSON
BY
ATTORNEY

United States Patent Office 2,791,621
Patented May 7, 1957

2,791,621

ELECTRICAL APPARATUS

William Henry Lewis Hewitt, Keresley, Coventry, and Arthur Ian Forbes Simpson, Leamington Spa, England, assignors to The General Electric Company Limited, London, England Application January 17, 1952, Serial No. 266,911

Claims priority, application Great Britain January 19, 1951

3 Claims. (Cl. 174—16)

The present invention relates to electrical apparatus. In certain forms of electrical apparatus, for example radio transmitters, it is known to provide means to blow air over some components of the apparatus such as valves in order to cool them. In apparatus for use in aircraft, for example, it is sometimes required that the various components shall be contained in a sealed housing and it is then more difficult to cool the components.

One object of the present invention is to provide apparatus having an improved cooling arrangement under such conditions.

According to the present invention, electrical apparatus comprises an elongated metal housing which is divided along its length by a partition into two compartments, this partition lying part-way across the housing, electrical components in each of said compartments, and a gas impeller located within the housing whereby, under pressure from the said impeller, gas may be caused to circulate in a closed circuit so as to pass over the components in one of the compartments, through an aperture or apertures in the said partition, over the components in the other compartment and then to return to the first-mentioned compartment by passing along substantially the length of the housing between the said components and the housing.

If one of the compartments contains an electric power unit which is required to dissipate a relatively large amount of heat, it is preferable that the direction of gas circulation shall be through the other compartment, which may contain a radio transmitter, the compartment containing the power unit and then back along the length of the housing to the other compartment. The impeller may be mounted in the compartment containing the power unit and it is desirable that any high wattage components, for example a carbon pile regulator and large thermionic valves, shall be placed close to the intake and outflow of the impeller so as to be in the main gas flow through the housing.

Preferably the housing is of uniform rectangular cross-section along its length and there are provided gaps between the partition and each side of the housing so that gas returning along the length of the housing flows evenly over the whole of the inner surface of the housing. The housing may be filled with components to the same profile as the partition and/or it may be shrouded to that profile. The return path along the length of the housing must of course be defined by the shrouding or other means. To assist cooling of the apparatus the inner and outer surfaces of the housing may be finished matt black and the shroud, if any, may have a similar finish. The black finish inside the housing ensures more even dissipation and the avoidance of hot spots.

One arrangement of a combined power unit and radio transmitter in accordance with the present invention and forming part of an aircraft installation will now be described by way of example with reference to the six figures of the accompanying drawings. In the drawings—

Figure 6:
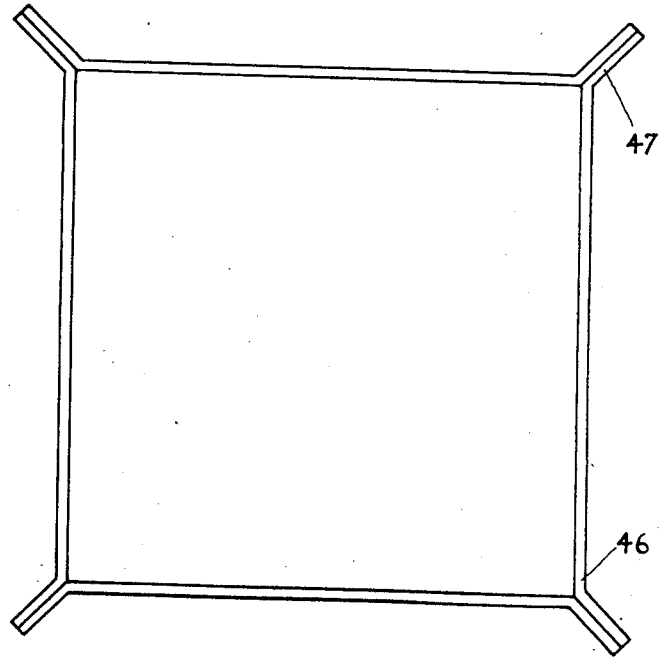

Figure 1 shows a plan view of the housing containing the power unit and transmitter unit, part of the housing being sectioned to show the contents thereof, Figure 2 shows a plan view of the power unit and transmitter removed from the housing, Figure 3 shows an elevation in the direction of the arrow III in Figure 2 so that Figure 2 is a view in the direction of the arrow II in Figure 3, Figure 4 is a plan view in the direction of the arrow IV in Figure 3, Figure 5 shows a perspective view of the combined power unit and transmitter when removed from its housing, and Figure 6 shows a cross section of a shroud which is fitted over the transmitter.

Referring to Figure 1 of the drawings, the combined power unit and transmitter are contained within a metal housing 1 which has dimensions of approximately five inches by five inches by sixteen inches and this housing is constructed as described more fully in the specification of copending United States patent application No. 266,864, filed January 17, 1952, and now abandoned, by William Henry Lewis Hewitt and Arthur Ian Forbes Simpson.

The housing 1 is in the form of a tube 2 of approximately square cross section which is fabricated from sheet metal and at one end this tube is closed by a metal plate 3 while the other end is open. This open end of the housing 1 is at the front of the housing when it is mounted in its normal position. The components of the transmitter and power unit are mounted on a metal chassis 4 which is arranged to slide into the housing 1 through this open end of the tube 2. A front panel 5 of the chassis is of relatively thick sheet metal and this panel 5 closes the open end of the tube 2 and is held in position by a plurality of screws (not shown) which pass through the panel 5 to engage with nuts.

The housing 1 may be adapted to be sealed so that the pressure within it may remain substantially constant at all altitudes at which it is likely to be operated. The pressure of air, or other gases, within the housing 1 may then be adjusted when the aircraft is on the ground to be either atmospheric at ground level or any other desired value and for this purpose a valve (not shown) may be provided on the panel 5 through which air or other gas may enter or leave the housing 1.

The chassis 4 is a three dimensional metal construction which extends substantially the whole length of the housing 1 and this chassis 4 carries a metal partition 6 which is located approximately half way along the length of the chassis so as to divide the housing 1 into a front compartment 7 which contains the power unit and a rear compartment 8 which contains the radio transmitter.

Referring now also to Figures 2, 3, 4 and 5 the chassis 4 comprises a pair of side members 11 and 12 which extend along the two sides of the front compartment so as to lie in close proximity to the housing 1 and portions 13 of these two side members 11 and 12 are cut away. In the rear compartment 8 the chassis 4 again has two side members 14 and 15 which have portions 16 that are cut away. The chassis has no top or bottom in either the front compartment 7 or the rear compartment 8 but the rear ends of the side members 14 and 15 are joined by a member 17 which itself has cut-away portions 18. In the rear compartment 8 the two side members 14 and 15 are spaced approximately ⅜ inch from the housing 1. The side members 14 and 15 also support further panels 21, 22, 23 and 24 on which are mounted the various components of the transmitter.

The partition 6 has only a single aperture 25 (shown only in Figure 2) and gaps 26 and 27 to a depth of approximately ⅜ inch are provided along each edge of the partition 6.

The power unit in the front compartment 7 comprises a rotary transformer 31 which is mounted with its axis along the length of the housing 1 and an air impeller or blower 32 is arranged to be driven by the rotary transformer 31. One end of the blower 32 lies adjacent to the aperture 25 in the partition 6 and an airtight seal 33 is provided so that any air passing through the aperture 25 must enter the impeller 32. A carbon pile regulator 34 is located towards the front of the compartment 7 so as to be in the main air flow from the impeller 32. Various other components such as relays 35, resistors 36 and condensers 37 are mounted in the compartment 7, some of them on panels such as the panel 38 as subassemblies so as to outline the compartment 7 to substantially the same profile as the partition 6.

The transmitter in the rear compartment 8 comprises a plurality of valves 41 and 42, a plurality of resistors 43, a plurality of condensers 44 and coils 45. A metal shroud 46 (shown in detail in Figures 1 and 5 and in outline by a broken line in Figures 2 and 3) completely surrounds the transmitter and lies at the same level as the partition 6. This shroud 46 extends from the partition 6 to within a short distance of the rear of the chassis 4. The shroud 46 is shown in more detail in Figure 6 and is provided with ribs 47 at the four corners thereof so as to provide support within the housing 1. A number of openings 48 are provided in the shroud 46 to enable adjustment of various condensers and inductances to be made. Some or all of these openings 48 may be closed with rubber or metal plugs (not shown). When the apparatus is being aligned, the shroud 46 should be in position so that there is no appreciable change of the circuit constants of the transmitter when the chassis 4 is moved into the housing 1.

All connections to the power unit and transmitter are made through sockets 51. When the rotary transformer 31 is running during normal operation, air passes over the armature of the transformer 31 and then over the commutators 52 and the associated brush gear 53 so as to be delivered close to the front end of the housing 1. As there is no path for the air from the impeller delivery to its intake except past the rear end of the shroud 46, all circulating air must pass substantially the full length of the housing 1 before returning to the impeller 32 through the transmitter and the aperture 25. As various components and sub-compartments of the chassis 4 have different heat dissipations, the chassis 4 is arranged with deflectors and screens to give a suitable proportion of the air flow to each component and sub-compartment. For example the hottest part of the power unit is the carbon pile regulator 34 and a deflector 54 is provided in the panel 38 so that the major part of the air from the impeller 32 passes over the regulator 34. Similarly, in the transmitter, the output valve 42 is the hottest part and it is located near the aperture 25 so that most of the air that passes through this aperture must pass over the valve 42. The general direction of the air flow is shown by the lines 55 in Figures 2, 3 and 4 although in those figures it will, of course, be realised that the housing 1 is not shown and the shroud 46 is only shown in outline in Figures 2 and 3.

The circulating air is cooled by transferring its heat to the housing 1 as it passes along the length thereof before entering the rear compartment 8. To ensure an even distribution of heat by internal radiation the inner and outer surfaces of the shroud 46 and the inner surface of the housing 1 are given a matt black finish and the outside of the housing is similarly finished to assist the external radiation.

In the arrangement described above the total surface area of the housing 1 is approximately 500 square inches and this is required to dissipate energy corresponding to approximately 120 watts. When the temperatures of the power unit and transmitter have risen during use to steady values, it is found that the necessary energy loss corresponding to approximately 0.24 watt per square inch can be achieved with a temperature of about 70° C. within the housing 1 when the ambient temperature is 22° C.

When the ambient temperature is high, forced air cooling may be applied to the outside of the housing of apparatus in accordance with the invention. Alternatively, water cooling may in some cases be used in those circumstances.

We claim:

1. Electrical apparatus comprising an elongated metal housing which is a good heat conductor and of which both the inner and outer surfaces are finished in matt black, an apertures partition lying part-way across the housing so as to divide the housing along its length into two compartments and to provide a gap between the partition and each side of the housing, electrical components in each of said compartments, a shroud surrounding said electrical components in one of said compartments, means for mounting said electrical components and said shroud so as to define a free passage along the length of both compartments between the said electrical components and the inner surface of the housing on one end and between the shroud and the inner surface of the housing at the other end, a gas impeller having an intake end and an exhaust end, said impeller being mounted in one of said compartments with an end adjacent the aperture in said partition whereby to circulate gas in a closed circuit which is wholly within the housing so that the gas passes over the components in one of the compartments, through the aperture in the said partition, over the components in the other compartment and then returns to the first-mentioned compartment by passing along substantially the length of the housing through the passage defined by the components, the shroud and the inner surface of the housing and through the gaps between the partition and the sides of the housing, and electrical driving means which is coupled to the gas impeller so as to drive the impeller and which is mounted within the housing.

2. Electrical apparatus according to claim 1 wherein the inner and outer surfaces of said shroud are finished in matt black.

3. Electrical apparatus according to claim 1 wherein the said metal housing is of uniform rectangular cross-section along its length.

References Cited in the file of this patent

UNITED STATES PATENTS

| 1,537,228 | Gargan | May 12, 1925 |
| 1,708,935 | Christopher | Apr. 16, 1929 |
| 2,187,011 | Braden | Jan. 11, 1940 |
| 2,452,248 | Lee | Oct. 26, 1948 |
| 2,654,583 | Treanor | Oct. 6, 1953 |